(12) United States Patent
Zien et al.

(10) Patent No.: US 7,201,355 B1
(45) Date of Patent: Apr. 10, 2007

(54) SUPPORT BRACKET FOR DIFFERENTLY SIZED BUCKETS

(75) Inventors: Jerry J. Zien, Prior Lake, MN (US); Nathan J. Friberg, Bloomington, MN (US)

(73) Assignee: Miller Manufacturing Company, Eagan, MN (US)

( * ) Notice: Subject to any disclaimer, the term of this patent is extended or adjusted under 35 U.S.C. 154(b) by 12 days.

(21) Appl. No.: 11/069,290

(22) Filed: Mar. 1, 2005

(51) Int. Cl.
*A47H 1/10* (2006.01)

(52) U.S. Cl. .................. 248/301; 248/304; 248/339

(58) Field of Classification Search ............... 248/301, 248/304, 339, 312.1, 313, 210, 211, 303, 248/305, 306, 307, 310; 119/61.57, 61.5, 119/72
See application file for complete search history.

(56) References Cited

U.S. PATENT DOCUMENTS

| | | | | |
|---|---|---|---|---|
| 3,578,205 A | * | 5/1971 | Ballester | ............... 220/694 |
| 4,452,415 A | * | 6/1984 | Arnold | .................. 248/312.1 |
| 6,102,349 A | * | 8/2000 | Hall | .................. 248/312.1 |
| 6,250,595 B1 | * | 6/2001 | Campbell | .................. 248/211 |

OTHER PUBLICATIONS

Catalog Page showing 9-4012-18 Bucket Bracket (undated but admitted prior art).
Three photographs showing Fortex WB-20 Wall Bracket (undated but admitted prior art).

* cited by examiner

*Primary Examiner*—Ramon O Ramirez
(74) *Attorney, Agent, or Firm*—James W. Miller

(57) ABSTRACT

A support bracket for hanging differently sized buckets comprises a bracket body which can be secured to a vertical support surface such as a wall. The bracket body includes a lip that forms an upwardly facing hook that hooks into a downwardly facing channel on the rim of the bucket. The bracket body includes fixed upper and lower seats for receiving the pivotal bail on the bucket. The pivotal bail of a larger bucket will be received in the upper seat and the pivotal bail of a smaller bucket will be received in the lower seat when the rim channel of the bucket is hung on the lip. A pin retains the pivotal bail of the bucket in whatever seat holds the bail.

23 Claims, 12 Drawing Sheets

SUPPORT BRACKET FOR DIFFERENTLY SIZED BUCKETS

TECHNICAL FIELD

This invention relates generally to farm, ranch and pet products. More particularly, this invention relates to a support bracket for holding a water or feed bucket used by animals.

BACKGROUND OF THE INVENTION

Various animals, particularly larger animals such as horses, are fed and watered from buckets that are supported on vertical support surfaces such as walls. Such buckets are quite heavy when fully loaded with feed or water. Various brackets are known for supporting such buckets on a wall. Preferably, it should be relatively easy to lift and remove the buckets from such brackets. In addition, the brackets must be strong enough to support the fully loaded weight of the buckets.

Certain support brackets are known which comprise an elongated bracket body that is bolted or screwed to a wall or post. A lip on the bottom of the bracket body is hooked into a channel on the rim of the bucket. The bail on the bucket is swung back into a seat formed on the bracket body above the lip. A pin can be dropped down in front of the bail to retain the bail in the seat. The bucket is supported on the support bracket by the bail retained in the bail receiving seat along with the support provided by the lip hooked into the rim channel of the bucket.

While such a support bracket is effective, it typically can hold only a single size of bucket or buckets that are close in size to one another. The reason for this is the bail receiving seat is placed to receive bails for certain sized buckets, but not bails for substantially larger or smaller buckets. If a substantially larger bucket is hung on the lip, the bail of such a larger bucket would not fit within the seat that would hold the bail of a smaller bucket. Thus, known brackets are not as adaptable for holding buckets of widely different sizes as would be desirable.

One known prior art bucket attempted to solve this problem by making the bail receiving seat vertically adjustable relative to the lip on the support bracket. Thus, the bail receiving seat could be slid up and down to receive the bail regardless of the size of the bucket hung from the lip. However, it is inconvenient and time consuming to have to make such an adjustment simply to adapt the bracket from one sized bucket to another sized bucket. As a practical matter, the bail receiving seat would often be left in a single position and the support bracket would be used for hanging buckets of a single size. Thus, this type of adjustable bracket was not as user friendly as would be desired when trying to support or hang different sized buckets from the support bracket.

SUMMARY OF THE INVENTION

One aspect of this invention relates to a support bracket for a bucket having a pivotal bail. The support bracket comprises a bracket body. A lip is provided on the bracket body for engaging and partially supporting the bucket. Vertically spaced upper and lower bail receiving seats are also provided. A smaller bucket when engaged with the lip has the bail thereof received in the lower bail receiving seat and a larger bucket when engaged with the lip has the bail thereof received in the upper bail receiving seat.

Another aspect of this invention relates to a support bracket for a bucket having a pivotal bail. The support bracket comprises a bracket body. A lip is provided for engaging and partially supporting the bucket. A plurality of vertically fixed bail positions are provided for capturing larger and smaller bails of different size buckets.

Yet another aspect of this invention relates to a support bracket for a bucket, The support bracket comprises a bracket body. A lip is provided on the bracket body for engaging a first portion of the bucket. First and second vertically spaced seats are provided with either seat receiving a second portion of the bucket when the first portion of the bucket is supported by the lip such that the lip and one of the seats together fully support the bucket.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
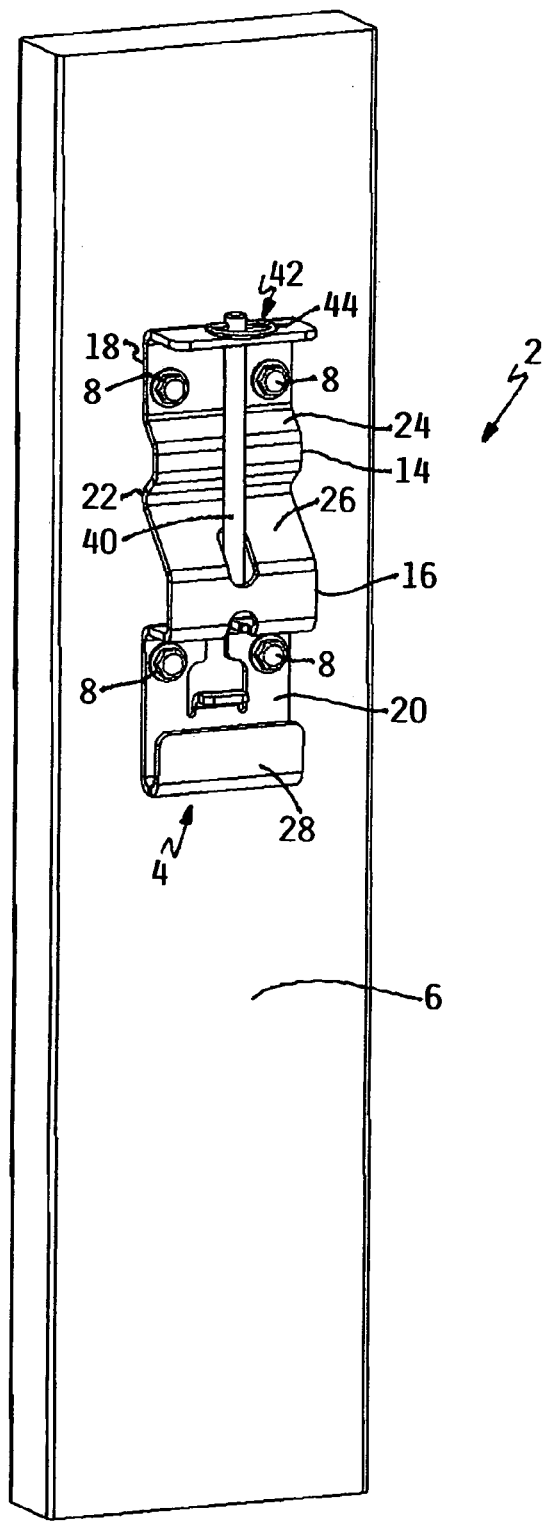
FIG. 1 is a perspective view of a first embodiment of a support bracket according to this invention, particularly illustrating the support bracket installed on a vertical surface with the pin fully inserted in the bracket body but without any bucket being supported on the bracket body.

Referring first to FIGS. 1–6, a first embodiment of a support bracket according to this invention is illustrated generally as 2. Support bracket 2 comprises a bracket body 4 that can be mounted on a vertical surface 6, such as the wall of a barn, the side of a post, etc. Support bracket 2 can be rigidly fixed to vertical surface 6 by a plurality of fasteners 8, such as screws or bolts, that pass through spaced openings 10 in bracket body 4 and into or through vertical surface 6 to attach support bracket 2 to vertical surface 6 in a known manner. When so attached, support bracket 2 can be used to support or hang differently sized buckets 12 therefrom as will be explained in more detail hereafter.

Figure 2:
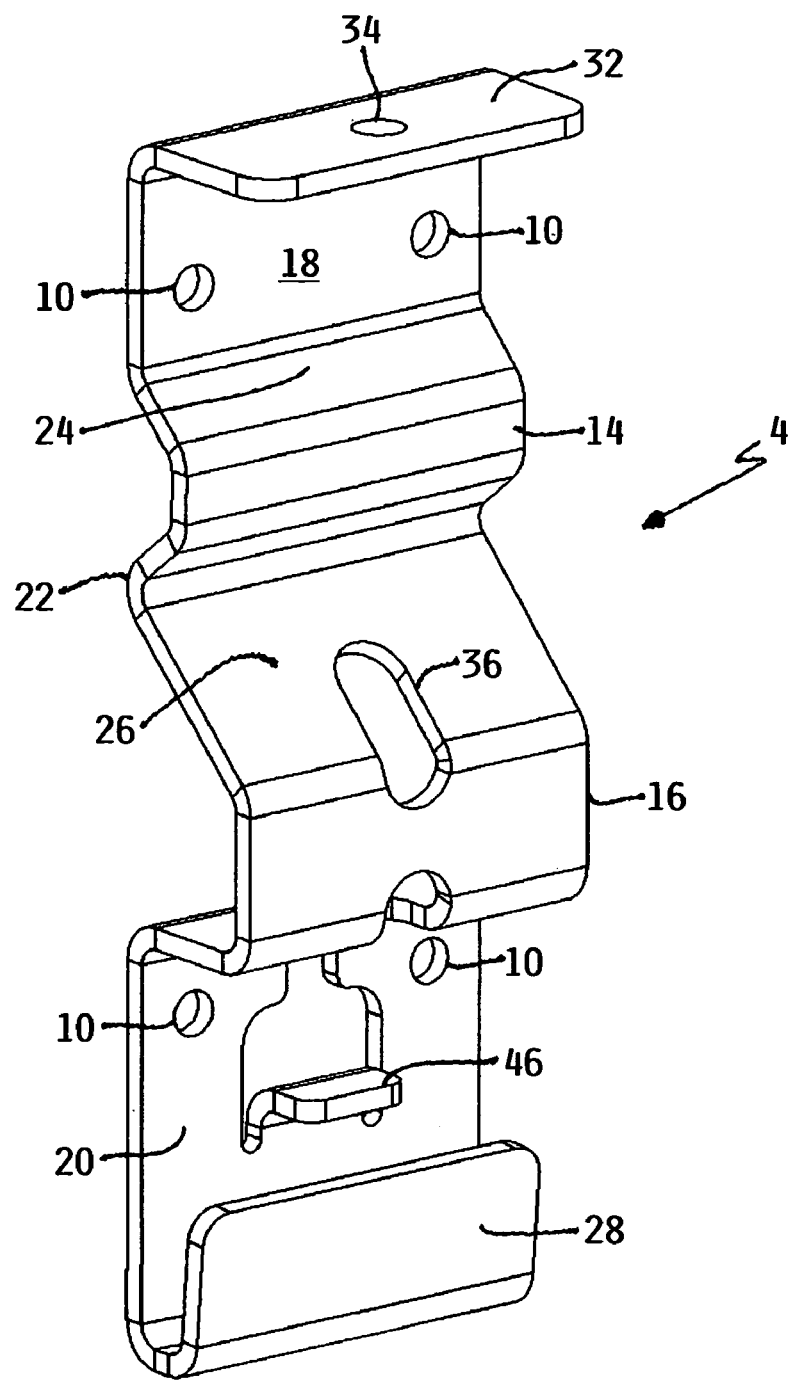
FIG. 2 is a perspective view of the bracket body of the support bracket shown in FIG. 1.
Figure 3:
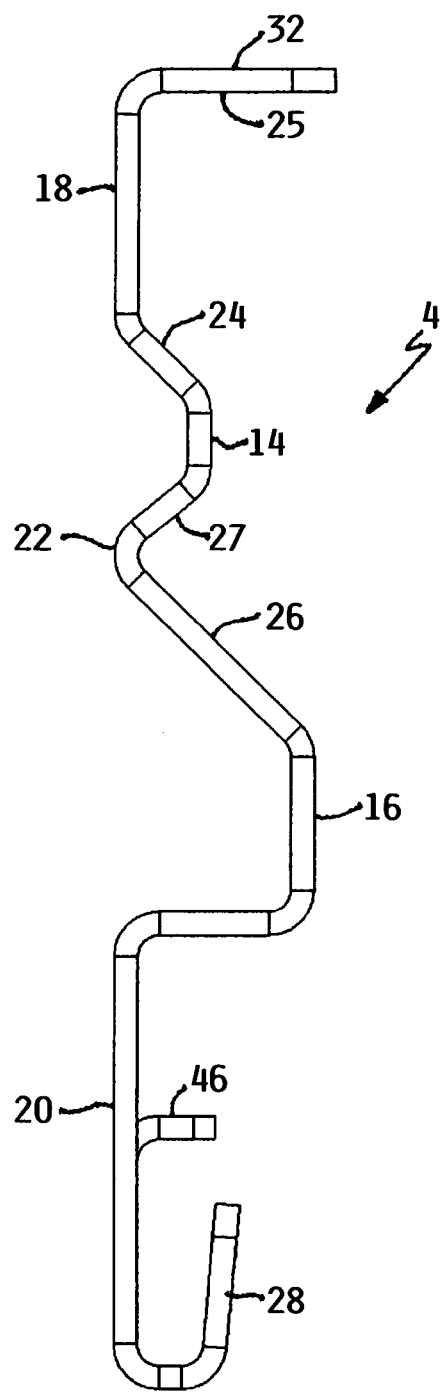
FIG. 3 is a side elevational view of the bracket body of the support bracket shown in FIG. 1.

The back of bracket body 4 could comprise a substantially continuous, planar surface. However, as shown in FIGS. 2 and 3, bracket body 4 is preferably contoured to have upper and lower forwardly extending steps 14 and 16. Thus, only the top and bottom ends 18 and 20 of bracket body 4 along with an intermediate portion 22 of bracket body 4 located between the upper and lower steps 14 and 16 lie in a common plane. It is only the back of these portions of bracket body 4, namely the back of the portions 18, 20 and 22 lying within the common plane, that abut against vertical surface 6 when support bracket 2 is attached to vertical surface 6. Alternatively, intermediate portion 22 of bracket body 4 could lie a short distance forwardly of the common plane against which top and bottom ends 18 and 20 lie to help ensure that bracket body 4 lies flat against vertical surface 6 given customary manufacturing tolerances.

As shown most clearly in FIGS. 2 and 3, lower step 16 of bracket body 4 is larger than upper step 14 and projects further forwardly than upper step 14. Each step 14 and 16 has an inclined upper face that forms a seat for receiving the pivotal bail 13 of whatever bucket 12 is supported on bracket body 4. Thus, the upper face of upper step 14 forms an upper bail receiving seat 24. Similarly, the upper face of lower step 16 forms a lower bail receiving seat 26. See FIGS. 2 and 3.

Bottom end 20 of bracket body 4 has a forwardly projecting, hook-shaped, bottom lip 28 thereon. The hook-shape of lip 28 faces upwardly and preferably hooks into or is received within the downwardly facing, U-shaped channel 30 that is often formed on the rims of many buckets 12. When bucket 12 is a flat back bucket as shown herein, lip 28 will be a straight lip along the back of bucket 12 conforming to the straight shape of the flat back of bucket 12.

Alternatively, lip 28 could be curved or could comprise a plurality of straight, small, spaced lips arranged on a curve for use with buckets having curved backs. Moreover, lip 28 need not be hook shaped to fit within rim channel 30 of bucket 12. For example, lip 28 could comprise a straight horizontal ledge for engaging against the bottom of bucket 12. Alternatively, lip 28 could have some other shape for coacting with some other portion of bucket 12. However, as noted above, a hook-shaped lip 28 is preferred for hooking in rim channel 30 of bucket 12.

Top end 18 of bracket body 4 has a forwardly projecting, horizontal top wall 32. Top wall 32 includes a circular hole 34. Lower step 16 on bracket body 4 includes an elongated slot 36 in the upper face thereof. Slot 36 in lower step 16 of bracket body 4 is aligned with hole 34 in top wall 32 of bracket body 4 and a vertical axis passing through the aligned slot and hole is located forwardly of upper step 14 on bracket body 4.

An elongated retaining pin 40 can be inserted down through hole 34 in top wall 32 and slot 36 in lower step 16 as shown in FIG. 1. The pin is prevented from falling through bracket body 4 by an enlarged head 42 on the top of pin 40 that rests on top wall 32 of bracket body 4 when pin 40 is fully inserted in bracket body 4. Head 42 could comprise an integrally formed abutment at the top of pin 40 or a cotter type ring 44 inserted through the top of pin 40.

Figure 4:
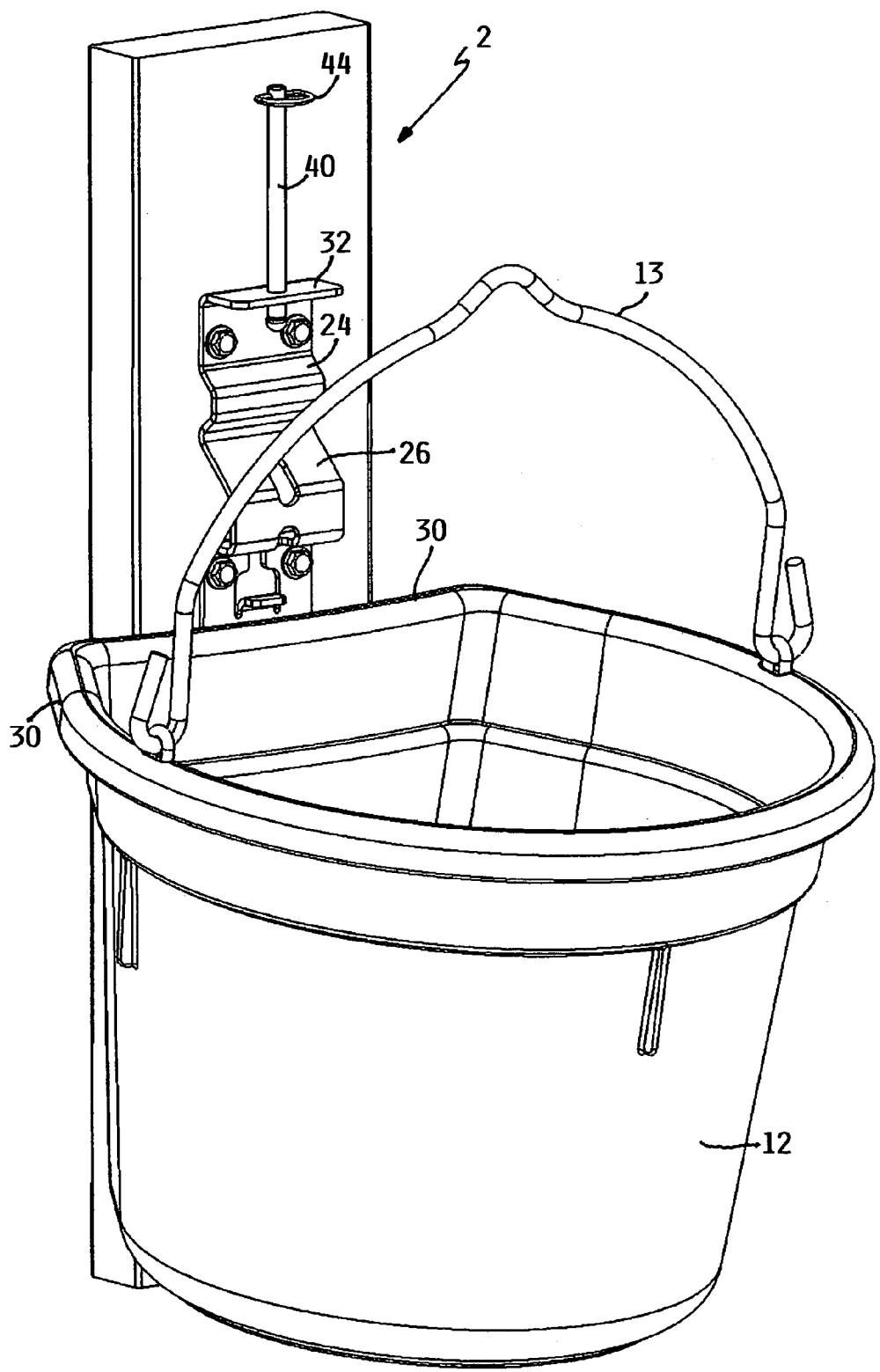
FIG. 4 is a perspective view similar to FIG. 1 of the support bracket shown in FIG. 1, particularly illustrating the pin partially withdrawn from the bracket body and with a bucket being shown midway in the process of being installed on or removed from the bracket body.
Figure 5:
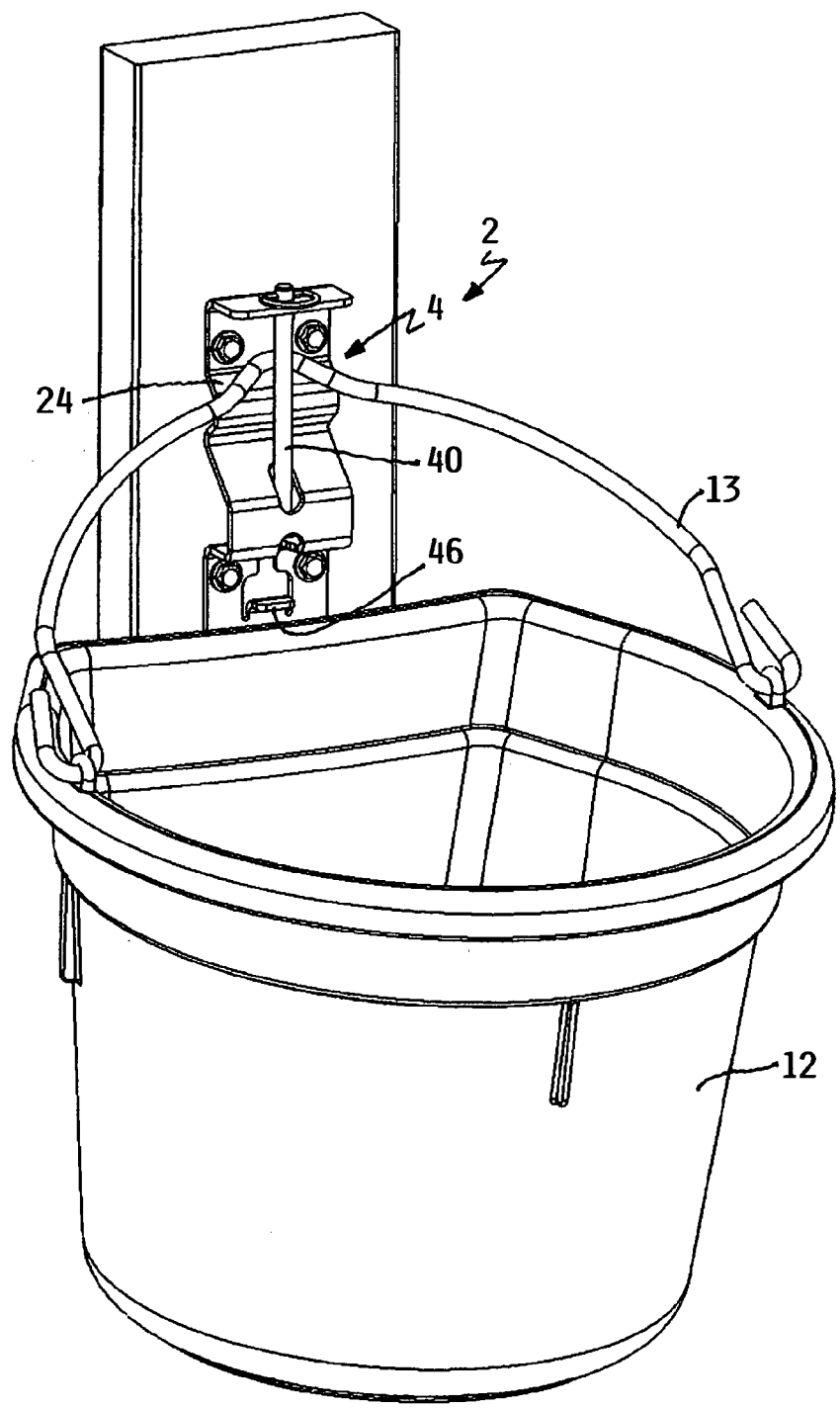
FIG. 5 is a perspective view similar to FIG. 4, particularly illustrating the bucket shown in FIG. 4 having been fully installed on the bracket body with the bail of the bucket located within the upper bail receiving seat.

Referring now to FIGS. 4 and 5, a first, relatively large bucket is shown being installed on support bracket 2. The back of bucket 12 is first hooked on lip 28 of support bracket 2 as shown in FIG. 4. This will partially support bucket 12 on support bracket 2, but without more bucket 12 would fall off lip 28 given the weight of the water or feed contained within bucket 12. Bail 13 must additionally be secured to support bracket 2 in order to retain bucket 12 on support bracket 2.

To secure bail 13 to support bracket 2, the user lifts pin 40 until pin 40 clears both the upper and lower bail receiving seats 14 and 16. When a larger bucket is being installed, bail 13 is pivoted back until it rests or is received within upper bail receiving seat 24. Pin 40 can then be released and dropped back down to retain bail 13 within upper bail receiving seat 24. This is shown in FIG. 5. Bail 13 simply rests against seat 24 and is retained therein by the fully inserted pin 40. Now, bucket 12 will remain on support bracket 2 regardless of how heavily bucket 12 is loaded.

Figure 6:
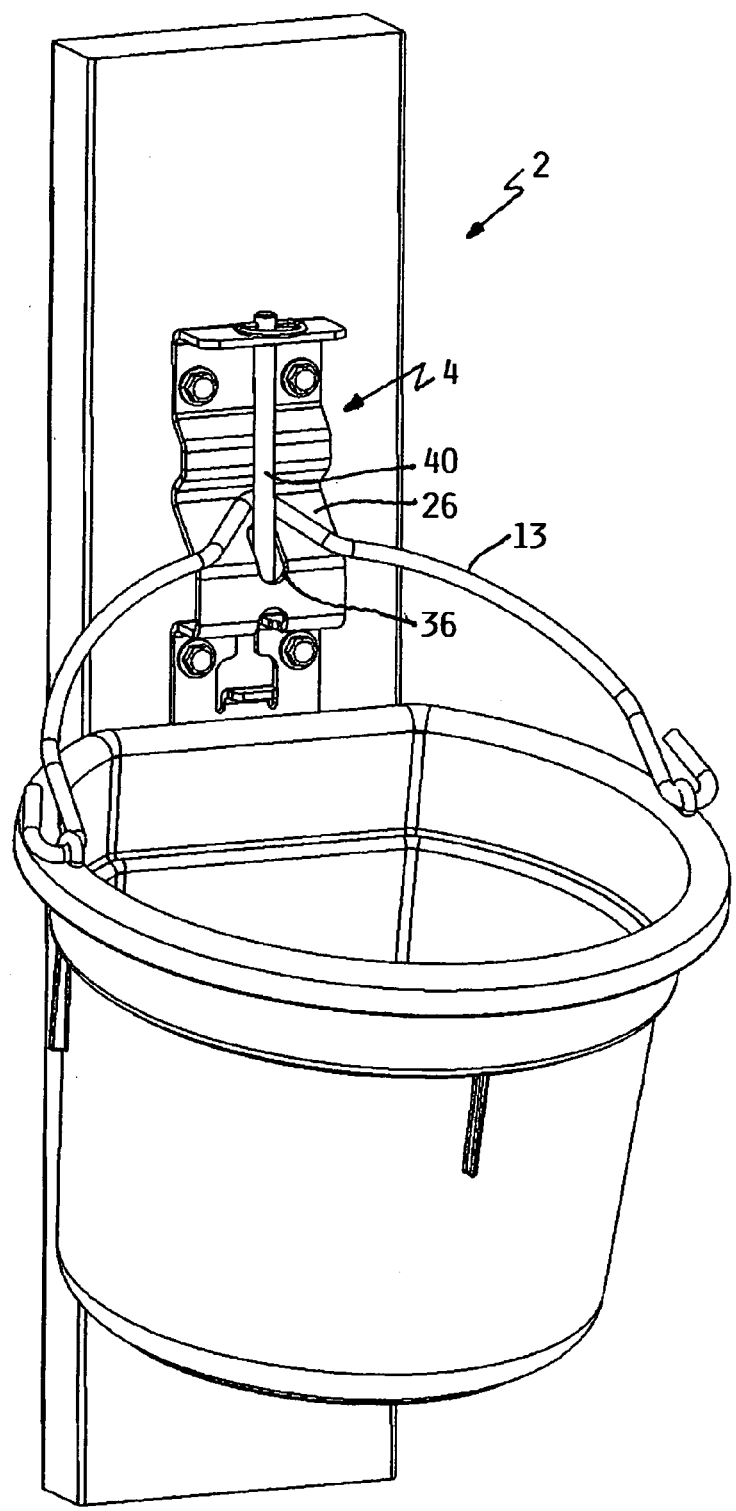
FIG. 6 is a perspective view similar to FIG. 5, particularly illustrating a bucket smaller than the bucket shown in FIG. 4 having been fully installed on the bracket body with the bail of the bucket located within the lower bail receiving seat.

Referring now to FIG. 6, the same support bracket 2 can easily accommodate a smaller sized bucket with one simple difference during installation. After hooking rim channel 30 of bucket 12 on lip 28 of bracket body 4, and after lifting pin 40 at least far enough to clear lower bail receiving seat 26, bail 13 is simply pivoted back until it is received in lower bail receiving seat 26 rather than upper bail receiving seat 24. Pin 40 can then be dropped down and the smaller bucket will be held on support bracket 2 in the same way as the larger bucket, albeit with bail 13 now received in lower bail receiving seat 26 rather than upper bail receiving seat 24. Compare FIG. 6 to FIG. 5.

To prevent an animal from bumping bucket 12 and disengaging lip 28 from rim channel 30, bottom end 18 of bracket body 4 can include an outwardly extending finger 46 overlying lip 28. There is enough space between finger 46 and lip 28 to allow the user to easily slip rim channel 30 of bucket 12 between lip 28 and finger 46 to hook rim channel 30 onto lip 28. However, if an animal bumps bucket 12 upwardly on support bracket 2, finger 46 will stop such upward movement before rim channel 30 of bucket 12 disengages lip 28.

However, finger 46 could be dispensed with if so desired. The lower face of top wall 32 of bracket body 4 forms a first stop 25 for bail 13 when bail 13 is in engagement with upper bail receiving seat 24. Similarly, the lower face of step 14 forms a second stop 27 for bail 13 when bail 13 is in engagement with lower bail receiving seat 26. See FIG. 3. Thus, if an animal bumps bucket 12 tending to lift bucket 12 off lip 28, the engagement of bail 13 with either stop 25 or stop 27, depending upon which seat 24 or 26 was in use, could occur soon enough to prevent bucket 12 from disengaging lip 28. Thus, providing a stop above each bail receiving seat as just described could be used in place of finger 46 or in addition to finger 46 to help securely retain bucket 12 on bracket 2.

Support bracket 2 of this invention supports different sized buckets 12 without the need for making any adjustments in the components of support bracket 2 to adapt support bracket 2 from one bucket size to another bucket size. Indeed, bracket body 4 of support bracket 2 and its upper and lower bail receiving seats 24 and 26 are all integrally formed out of a durable material, such as steel or high strength plastic. Pin 40 simply drops down into and lifts up out of the aligned hole and slot 34 and 36 in bracket body 4 regardless of which sized bucket is being installed. The user simply pivots bail 13 on a larger bucket into upper bail receiving seat 24 and bail 13 on a smaller bucket into lower bail receiving seat 26 before reinserting pin 40. There is nothing that needs adjustment—simply selective use of one bail receiving seat or the other.

A second embodiment of a support bracket according to this invention is shown in FIGS. 7–12 and is illustrated generally as 2'. Various components of support bracket 2' are similar to components of support bracket 2. Accordingly, those components in support bracket 2' which are the same as or correspond to components in support bracket 2 will be referred to using the same reference numerals as for those components in the first embodiment, except that the reference numerals for the second embodiment will be followed by a prime suffix. Thus, support bracket 2 of the second embodiment will be referred to as 2' instead of 2, etc. Support bracket 2' of the second embodiment will be described by describing the differences between it and support bracket 2 of the first embodiment.

In support bracket 2', upper bail receiving seat 24' and lower bail receiving seat 26' are now formed within pin 40' instead of bracket body 4'. In this regard, pin 40' is W-shaped with the upper notch of the W-shaped pin forming upper bail receiving seat 24' and the lower notch of the W-shaped pin forming lower bail receiving seat 26'. A plurality of aligned slots 36' are provided in bracket body 4 for releasably holding the top, middle and bottom of the W-shaped pin 40'.

Figure 7:
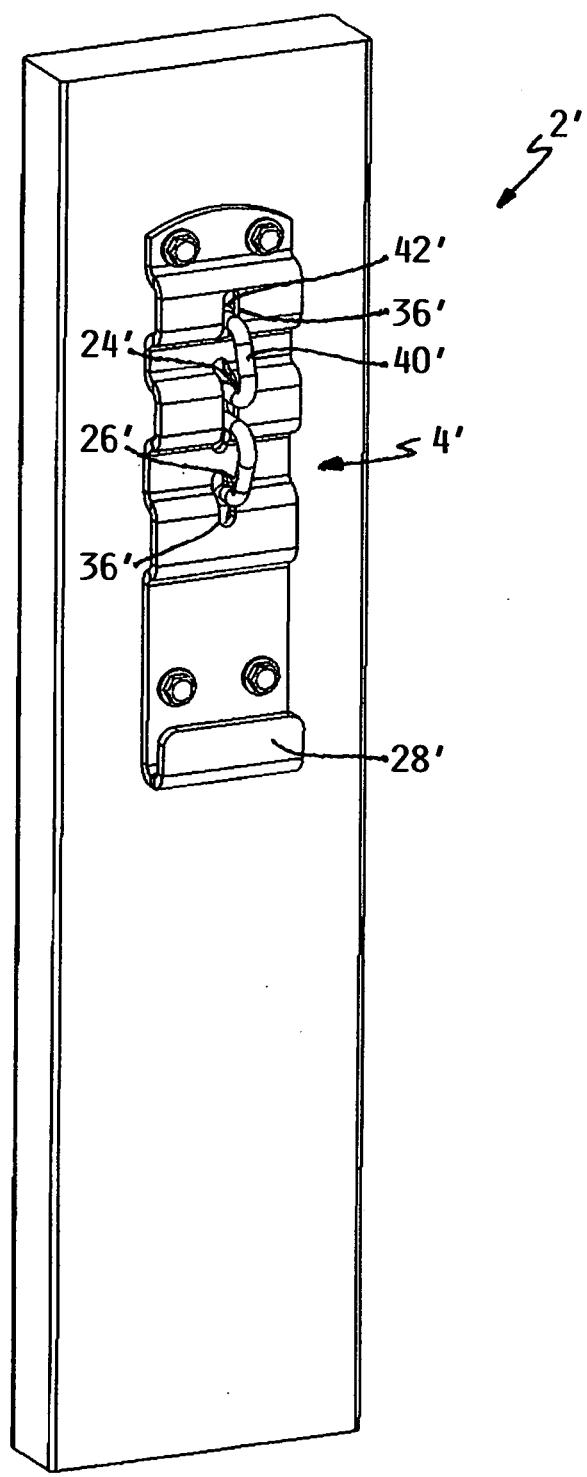
FIG. 7 is a perspective view of a second embodiment of a support bracket according to this invention, particularly illustrating the support bracket installed on a vertical surface with the pin fully inserted in the bracket body but without any bucket being supported on the bracket body.
Figure 8:
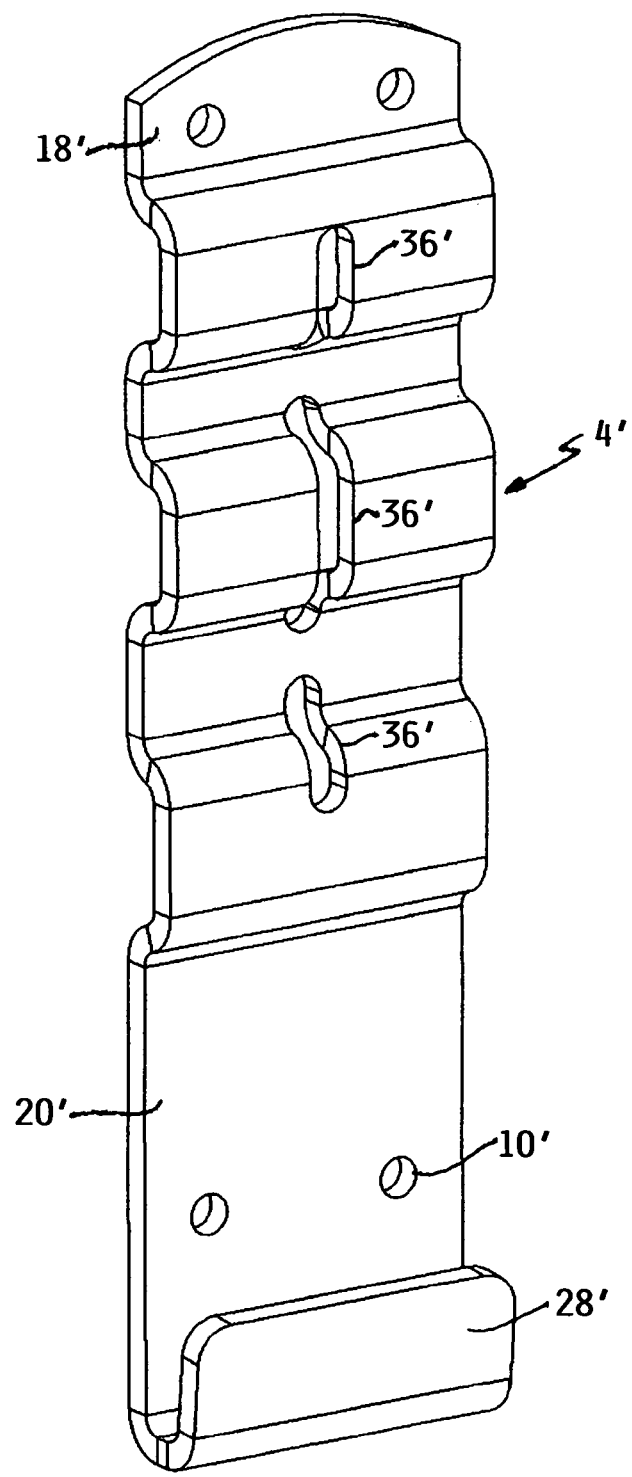
FIG. 8 is a perspective view of the bracket body of the support bracket shown in FIG. 7.

The top of pin 40' is formed with an enlarged, circular, integral head 42' that is too big to pass through the top slot 36' in bracket body 4. Thus, when support bracket 2' is fixed to a vertical surface 6', pin 40' is retained on support bracket 2' since head 42' of pin 40' is captured behind bracket body 4'. However, pin 40' can tilt or rotate relative to bracket body 4' about head 42' of pin 40' and the user can also slide pin 40' somewhat vertically up and down through the aligned slots 36' on bracket body 4'. This rotary and sliding movement of pin 40' allows pin 40' to be partially withdrawn from bracket body 4' as shown in FIG. 10 and then fully inserted in bracket body 4' as shown in FIG. 7, 11 or 12.

Figure 10:
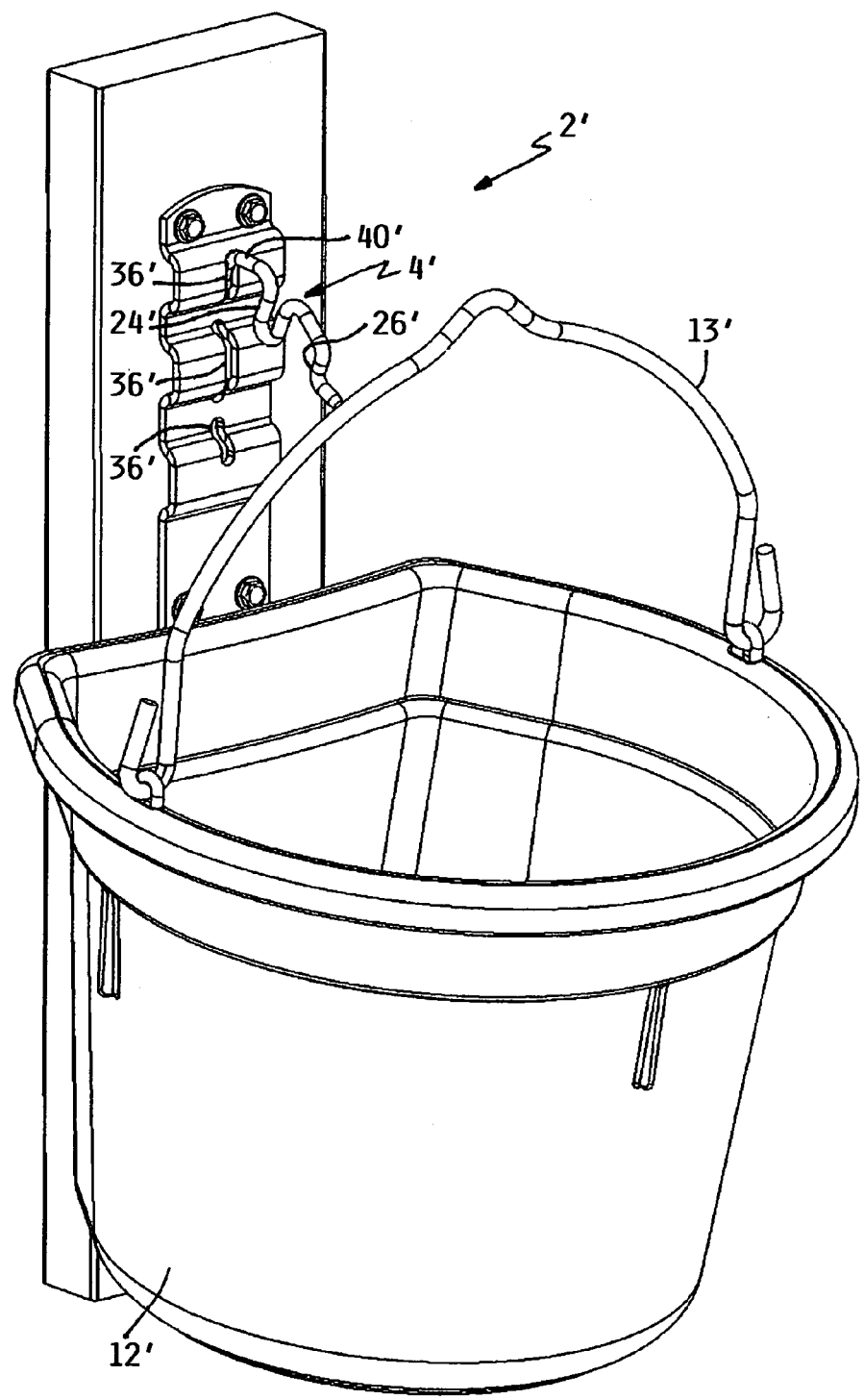
FIG. 10 is a perspective view similar to FIG. 7 of the support bracket shown in FIG. 7, particularly illustrating the pin partially withdrawn from the bracket body and with a bucket being shown midway in the process of being installed on or removed from the bracket body.

Referring first to FIG. 10', the user can slide pin 40' up enough relative to slots 36' to disconnect the bottom of pin 40' from lowermost slot 36' in bracket body 4'. The user can then pivot pin 40' relative to bracket body 4' about head 42' of pin 40'. This will open up a gap between pin 40' and bracket body 4'. After rim channel 30' of bucket 12' is placed on lip 28' of bracket body 4', the user can then place bail 13' within upper bail receiving seat 24' on pin 40' for a larger bucket, or within lower bail receiving seat 26' on pin 40' for a smaller bucket, and can then pivot pin 40' back down about head 42' of pin 40' until the middle and bottom of pin 40' reengage their respective receiving slots 36' in bracket body 4'. The user can then slightly slide pin 40' down relative to slots 36' to fully reinsert pin 40' in bracket body 4'.

Figure 11:
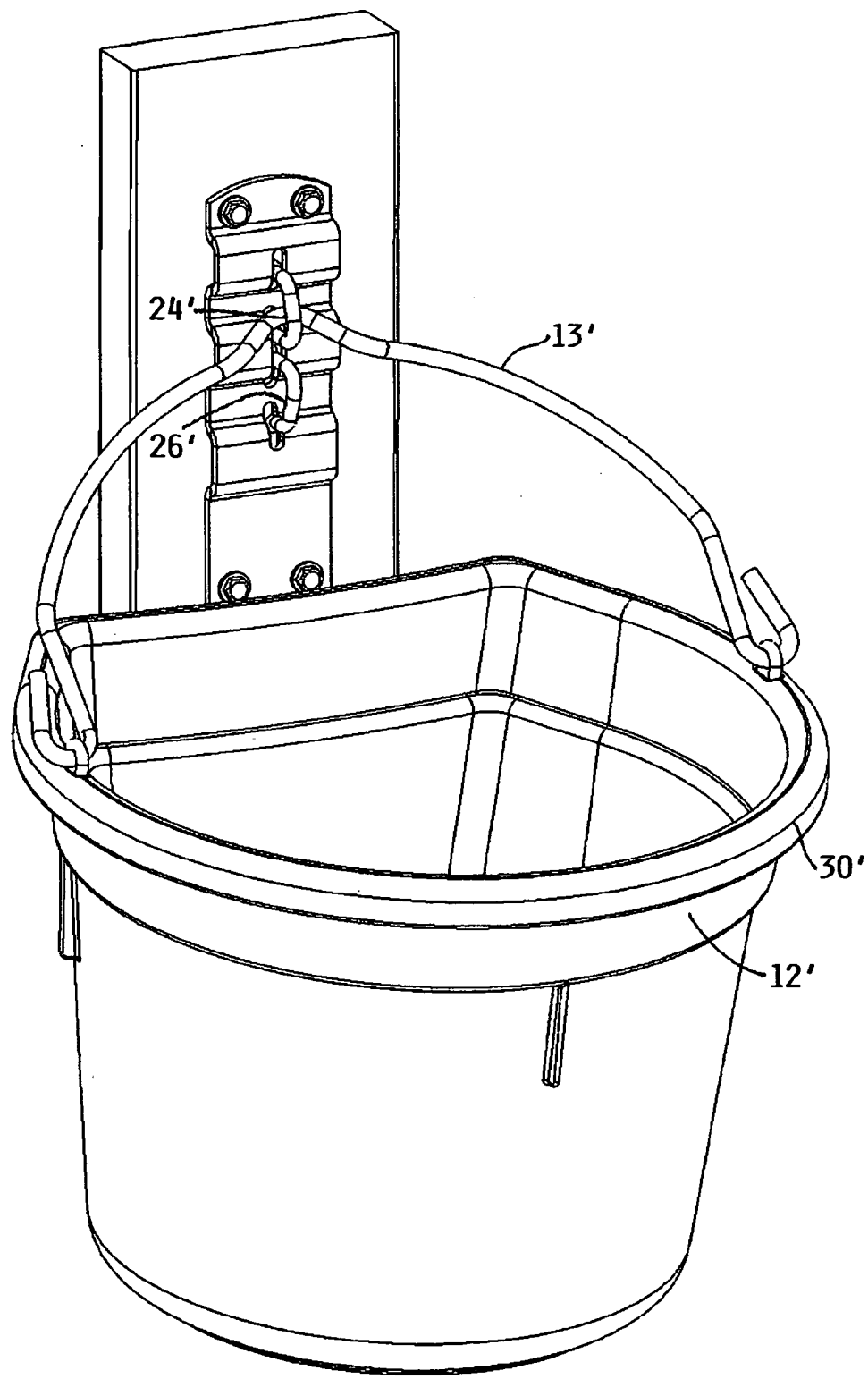
FIG. 11 is a perspective view similar to FIG. 10, particularly illustrating the bucket shown in FIG. 10 having been fully installed on the bracket body with the bail of the bucket located within the upper bail receiving seat.
Figure 12:
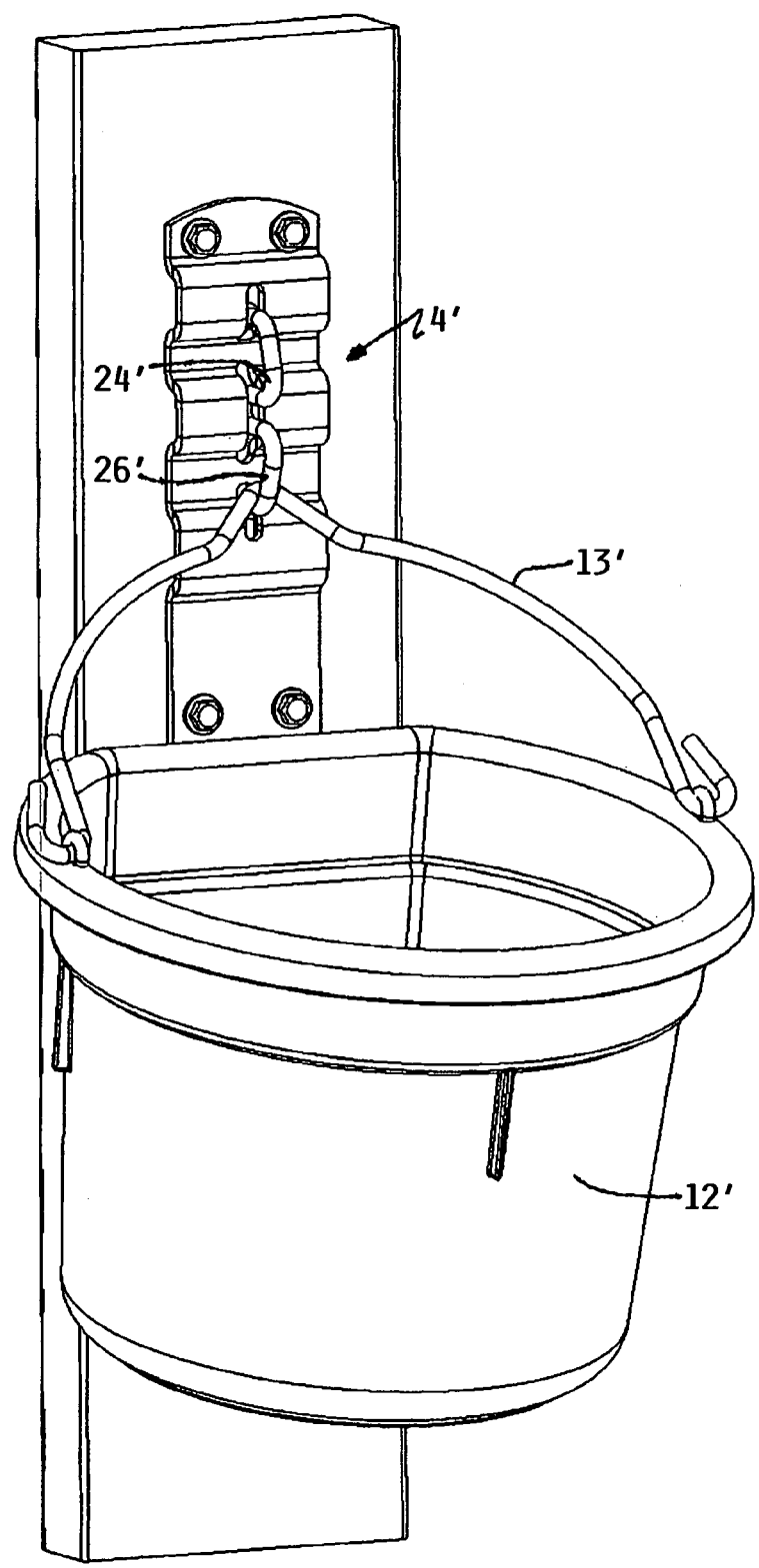
FIG. 12 is a perspective view similar to FIG. 11, particularly illustrating a bucket smaller than the bucket shown in FIG. 10 having been fully installed on the bracket body with the bail of the bucket located within the lower bail receiving seat.

FIG. 11 shows pin 40' of support bracket 2' fully inserted in bracket body 4' with support bracket 2' holding a larger bucket with bail 13' of bucket 12' received in upper bail receiving seat 24' formed on pin 40'. FIG. 12 shows the same thing except that a smaller bucket is shown on support bracket 2' with bail 13' of bucket 12' received in lower bail receiving seat 26'.

Figure 9:
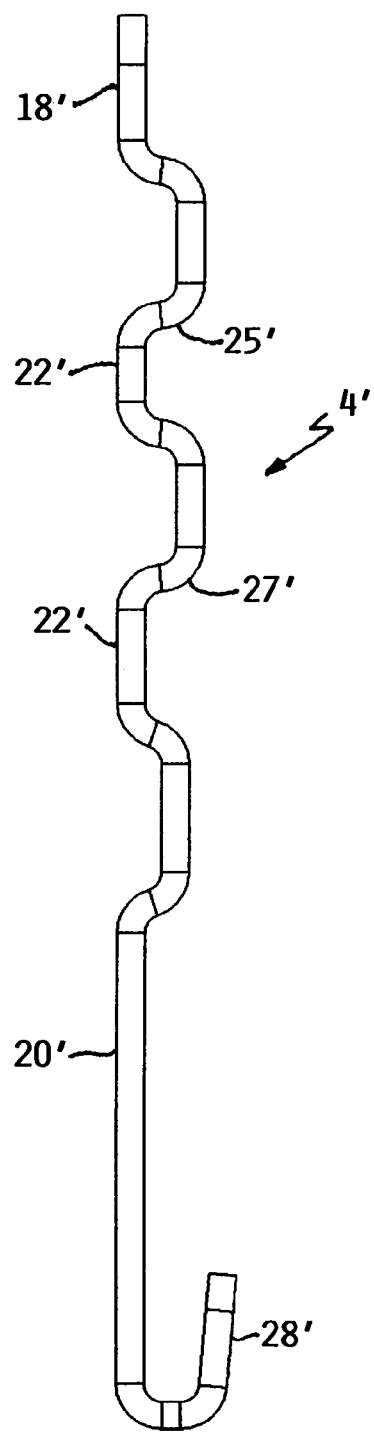
FIG. 9 is a side elevational view of the bracket body of the support bracket shown in FIG. 7.

Bracket body 4' is preferably formed of a corrugated or stepped configuration as shown in FIG. 9. This provides two stops 25' and 27', similar to stops 25 and 27, for restraining upward movement of bail 13' should an animal bump upwardly on the bottom of bucket 12'. This helps keep bucket 12' retained on lip 28'.

Various other modifications of this invention will be apparent to those skilled in the art. Thus, the scope of this invention will be limited only by the appended claims.

We claim:

1. A support bracket for a bucket having a pivotal bail, which comprises:
   (a) a bracket body;
   (b) a lip on the bracket body for engaging a rim on the bucket and thereby partially supporting the bucket by the rim;
   (c) a stop located relatively closely above the lip for engaging against the rim of the bucket should the bucket be bumped upwardly to help retain the rim of the bucket on the lip; and
   (d) vertically spaced upper and lower bail receiving seats which are separate and distinct from the stop with the seats both being spaced above the stop, wherein a smaller bucket when engaged with the lip has the bail thereof received in the lower bail receiving seat and a larger bucket when engaged with the lip has the bail thereof received in the upper bail receiving seat.

2. The support bracket of claim 1, wherein the upper and lower bail receiving seats are on the bracket body.

3. The support bracket of claim 2, wherein the upper and lower bail receiving seats are formed by forwardly projecting upper and lower steps on the bracket body.

4. The support bracket of claim 3, wherein the upper and lower bail receiving seats are formed by an upper face of each of the upper and lower steps, respectively.

5. The support bracket of claim 4, wherein the upper face of each of the upper and lower steps slopes downwardly as the upper and lower steps project forwardly.

6. The support bracket of claim 5, wherein the sloped upper faces of the upper and lower steps are substantially parallel to one another.

7. The support bracket of claim 3, wherein the upper step is shorter than the lower step.

8. The support bracket of claim 3, further including a pin passing in front of the bail for retaining the bail within one of the upper and lower seats.

9. The support bracket of claim 8, wherein the pin is vertically slidable on the bracket body in one direction to clear the bail receiving seats to allow a bail to be inserted into one of the bail receiving seats and is vertically slidable on the bracket body in another opposite direction to obstruct the bail receiving seats to retain the bail within the one seat.

10. The support bracket of claim 1, wherein the lip forms an upwardly facing hook that hooks into a downwardly facing channel on the rim of the bucket.

11. The support bracket of claim 1, wherein the upper and lower bail receiving seats are integrally formed portions of the bracket body.

12. The support bracket of claim 11, wherein the lip is also an integrally formed portion of the bracket body.

13. The support bracket of claim 1, wherein the bracket body is configured to be attached to a vertical surface.

14. A support bracket for a bucket having a pivotal bail, which comprises:
   (a) a bracket body;
   (b) a lip on the bracket body for engaging and partially supporting the bucket;
   (c) vertically spaced upper and lower bail receiving seats, wherein a smaller bucket when engaged with the lip has the bail thereof received in the lower bail receiving seat and a larger bucket when engaged with the lip has the bail thereof received in the upper bail receiving seat; and (d) a pin for capturing the bail of the bucket between the bracket body and the pin.

15. The support bracket of claim 14, wherein the pin is substantially straight and the upper and lower bail receiving seats are on the bracket body.

16. The support bracket of claim 14, wherein the pin is notched and the upper and lower bail receiving seats are formed by upper and lower notches on the pin.

17. A support bracket for a bucket having a pivotal bail, which comprises:

(a) a bracket body;

(b) a lip on the bracket body for engaging and partially supporting the bucket; and (c) a plurality of vertically spaced bail positions for capturing larger and smaller bails of different size buckets, and wherein each bail position includes a vertically extending obstruction that is high enough to extend in front of the bail when a bail is received in the bail position to prevent the bail from sliding out of the bail position.

18. The support bracket of claim 17, wherein each bail position comprises:

(a) a seat on which the bail of a bucket rests when a bucket is supported by the lip; and (b) a stop located above the seat for limiting upward movement of the bail off the seat to an amount less than that required to disengage the bucket and the lip in the event the bucket is bumped upwardly.

19. The support bracket of claim 18, wherein each seat of each bail position is formed by a stepped portion of the bracket body.

20. The support bracket of claim 18, wherein each seat of each bail position is formed by a notched portion of a pin carried on the bracket body.

21. The support bracket of claim 17, wherein the vertical obstruction at each bail position comprises a vertical pin.

22. The support bracket of claim 21, wherein the vertical pin is selectively installable at the bail position that carries the bail after the bail has been placed in the bail position.

23. The support bracket of claim 21, wherein a common vertical pin is used to form the vertical obstructions at both spaced bail positions.

* * * * *